(12) United States Patent
Chan et al.

(10) Patent No.: US 7,936,533 B2
(45) Date of Patent: May 3, 2011

(54) SYSTEM, METHOD AND APPARATUS FOR WALL SLOT IN DISK DRIVE BYPASS CHANNEL FOR ENHANCED VOICE COIL MOTOR COOLING

(75) Inventors: Andre S. Chan, Milpitas, CA (US); Chisin Chang, San Jose, CA (US); Ferdinand Hendriks, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 837 days.

(21) Appl. No.: 11/876,014

(22) Filed: Oct. 22, 2007

(65) Prior Publication Data

US 2009/0103206 A1 Apr. 23, 2009

(51) Int. Cl.
*G11B 33/14* (2006.01)
(52) U.S. Cl. .................................. 360/97.02
(58) Field of Classification Search ............... 360/97.02
See application file for complete search history.

(56) References Cited

U.S. PATENT DOCUMENTS

| | | | |
|---|---|---|---|
| 4,147,299 A | 4/1979 | Freeman | |
| 4,771,412 A | 9/1988 | Aihara et al. | |
| 5,301,178 A | 4/1994 | Okabe et al. | |
| 5,907,453 A | 5/1999 | Wood et al. | |
| 5,956,203 A | 9/1999 | Schirle et al. | |
| 6,208,484 B1 | 3/2001 | Voights | |
| 6,445,525 B1 | 9/2002 | Young | |
| 6,628,475 B2 * | 9/2003 | Nakamoto et al. | 360/97.02 |
| 6,724,564 B1 | 4/2004 | Codilian et al. | |
| 6,967,811 B1 | 11/2005 | Codilian et al. | |
| 7,203,030 B2 * | 4/2007 | Chan et al. | 360/97.02 |
| 2006/0114603 A1 | 6/2006 | Ser et al. | |

FOREIGN PATENT DOCUMENTS

| | | |
|---|---|---|
| JP | 62054888 | 10/1987 |
| JP | 11110960 | 4/1999 |

* cited by examiner

*Primary Examiner* — A. J. Heinz

(57) ABSTRACT

A hard disk drive bypass channel architecture incorporates enhanced cooling for voice coil motors. A cooling slot formed in a bypass channel component that is adjacent to the VCM alleviates VCM overheating problems. The slot compromises airflow from the bypass channel to provide sufficient secondary flow to cool the VCM and actuator coil area. The slot may be formed in the integrated wall of the spoiler or diverter. The spoiler has an extension in which the cooling slot is formed.

17 Claims, 4 Drawing Sheets

SYSTEM, METHOD AND APPARATUS FOR WALL SLOT IN DISK DRIVE BYPASS CHANNEL FOR ENHANCED VOICE COIL MOTOR COOLING

BACKGROUND OF THE INVENTION

1. Technical Field

The present invention relates in general to hard disk drives and, in particular, to an improved system, method, and apparatus for enhanced cooling of voice coil motors in hard disk drives.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm). Hard disk drives have several different typical standard sizes or formats, including server, desktop, mobile (2.5 and 1.8 inches) and microdrive.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

During operation, the VCM is prone to heat up to maintain fast seek times in high performance server class disk drives. Accordingly, the temperature of the VCM must be monitored since excessive temperature can degrade performance of the drive. In some operating environments and severe cases, the high temperatures generated by disk drives can melt the coil insulation and coating, thus resulting in catastrophic failures in the drive, such as outgassing, contamination, etc.

Some disk drives utilize a bypass channel to regulate airflow within the disk drive. With bypass architecture, the airflow is stripped from the disk pack, commonly by a diverter or spoiler, and diverted into the bypass channel. Ideally, the bypass channel should have no interruptions or leakage in order to maintain the airflow momentum throughout the channel. Unfortunately, this poses a dilemma for temperature-sensitive areas of the drive, such as the VCM, since bypass channels allow little or no flow into the VCM area. Thus, an improved airflow solution that satisfies the multiple and sometimes conflicting interests of bypass architecture would be desirable.

SUMMARY OF THE INVENTION

Embodiments of a system, method, and apparatus for enhanced cooling of VCMs in hard disk drives are disclosed. The invention helps alleviate overheating problems with VCMs by slightly compromising the airflow from the bypass channel. Sufficient secondary flow is provided to cool the VCM and actuator coil area. In one embodiment, the spoiler or diverter forms an integrated wall with the bypass channel that serves as an extension to the channel wall, which may be cast into the base casting of the disk drive enclosure. The spoiler, as a channel wall extension, is provided with a cooling slot that can be varied according to the cooling capacity required for specific disk drives and designs. The invention provides a significant increase in coil cooling capacity for slot geometries over previous designs with no slot provided.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
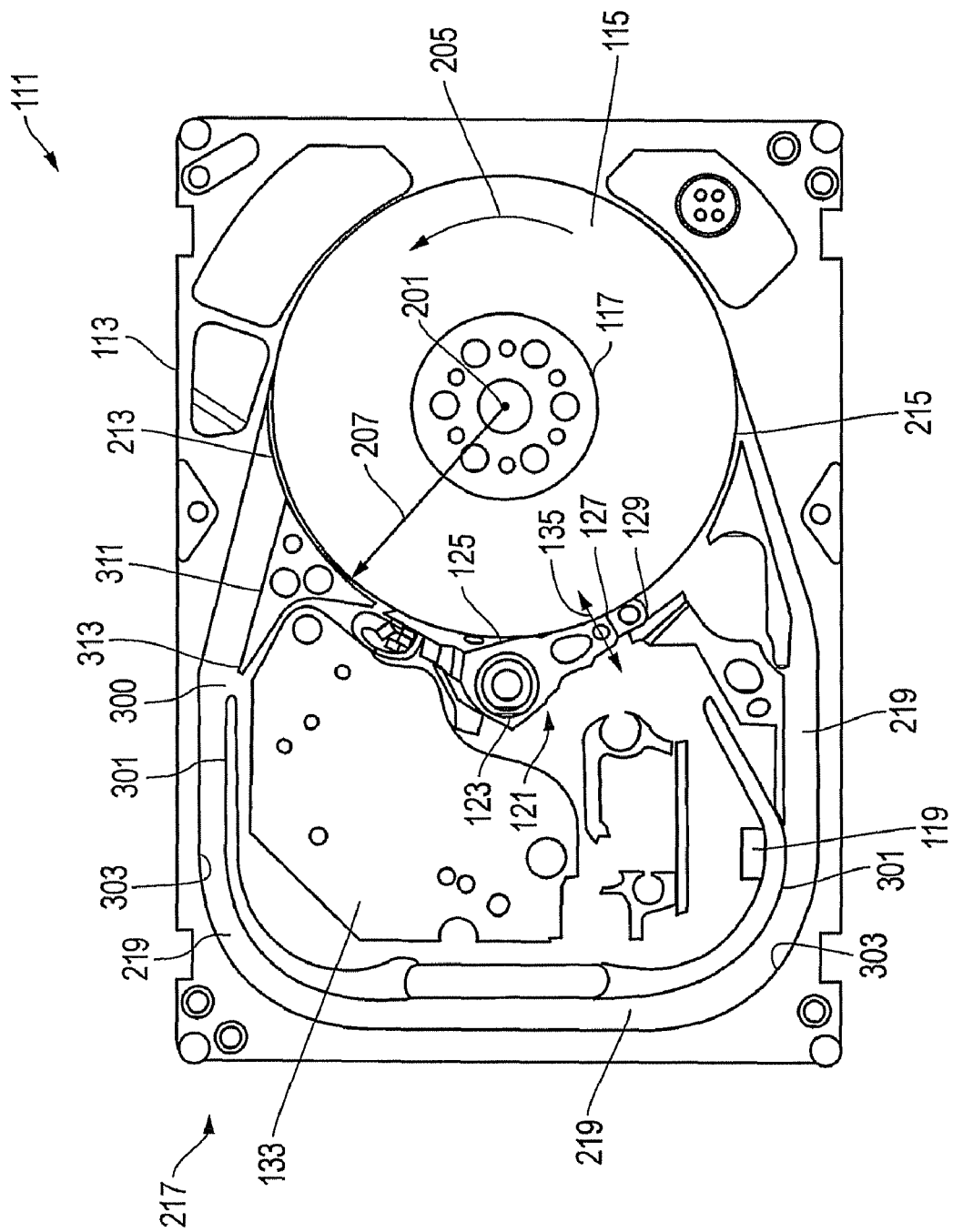
FIG. 1 is a plan view of one embodiment of a disk drive constructed in accordance with the present invention.
Figure 2:
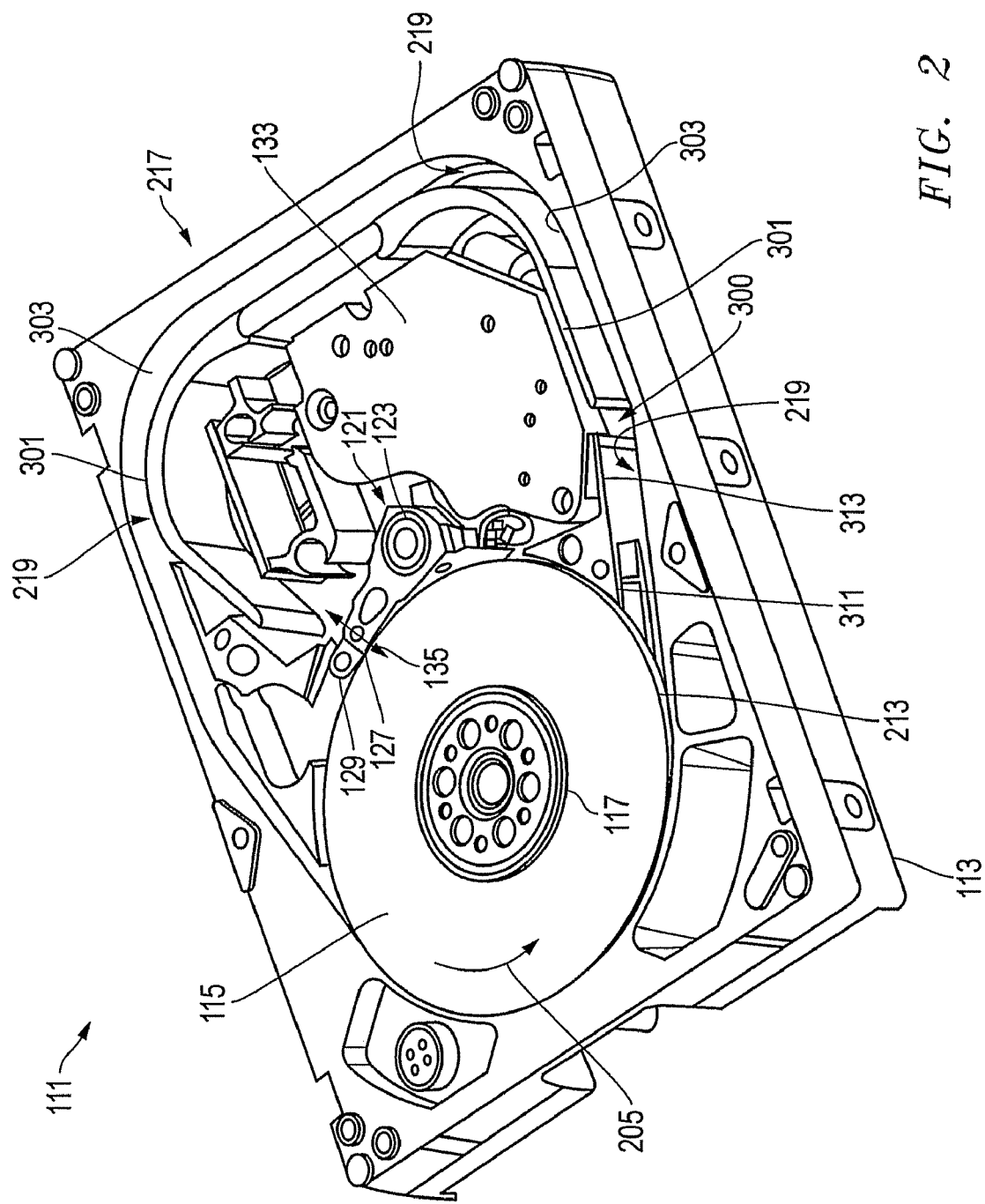
FIG. 2 is an isometric view of the disk drive of FIG. 1 and is constructed in accordance with the present invention.

Referring to FIGS. 1 and 2, one embodiment of a system, method, and apparatus for an information storage system comprising a magnetic hard disk file or drive 111 for a computer system is shown. Drive 111 has an outer housing including a base 113 and top cover (not shown). The housing contains a disk pack having at least one media disk, e.g., magnetic disk 115. The disks 115 are rotated (see arrows 205) by a spindle motor assembly having a central drive hub 117. An actuator 121 comprises a plurality of parallel actuator arms 125 in the form of a comb that is pivotally mounted to base 113 about a pivot assembly 123. A controller 119 is also mounted to base 113 for selectively moving the comb of arms 125 relative to disk 115.

Each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly (HGA) is the head and the slider 129, which are mounted on suspension 127.

Suspensions 127 bias the air bearing surface of the slider 129 against the disk 115 to cause the slider 129 to fly at a precise distance from the disk. A voice coil 133 free to move within a voice coil motor magnet assembly (not shown) is also mounted to arms 125 opposite the head gimbal assemblies. Movement of the actuator 121 (indicated by arrow 135) moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

The disks 115 define an axis 201 of rotation and a radial direction 207. The disks 115 have a downstream side 213 wherein air flows away from the disks 115, and an upstream side 215 wherein air flows toward the disks 115. The drive 111 also has a bypass channel 219 located in the housing 113 for directing the air flow generated by rotation of the disks 115 from the downstream side 213 of the disk pack or disks 115 to the upstream side 215 of the disks 115. In this way the airflow substantially bypasses the actuator 121 and voice coil motor assembly.

In the embodiment shown, the bypass channel 219 is located between an outer perimeter 217 of the housing 113 and the actuator 121, such that the bypass channel 219 completely circumscribes the actuator 121. The elements that define the bypass channel 219 may be integrally formed (e.g., cast) with the base 113. In some HDD designs where there is insufficient space to implement a full bypass channel (shown) the bypass channel 219 may be abbreviated (not shown), which is known as a partial bypass. Furthermore, in order to help the bypass airflow negotiate substantial angular changes (channel bends), one or more turning vanes may be placed in those areas.

The drive 111 also may comprise a slot 300 that is located adjacent to the voice coil motor assembly. The slot 300 is designed to be integrated and work with the bypass channel 219 for diverting a portion of the overall airflow toward and through the voice coil motor assembly. The bypass channel 219 includes inner and outer walls 301, 303 that define the conduit for the airflow. The slot 300 comprises an opening that is formed in the inner wall 301 next to the magnet, and may comprise a same axial dimension as that of the inner wall 301. The slot 300 may span a linear gap (i.e., generally in a radial direction relative to the disk 115) of approximately 1 mm to 20 mm. For example, a typical 3.5-inch server class drive the gap may comprise about 5 mm. As shown in the drawings, the slot 300 may comprise a flat rectangular hole.

As shown in the illustrated embodiment of FIGS. 1 and 2, the slot 300 in the inner wall 301 of the bypass channel 219 is located on the downstream side 213 (reference FIG. 1) of the media disk 115. The slot 300 may be defined between a spoiler or diverter 311, which forms an integrated wall with the bypass channel 219, and the inner wall 301 formed in the base casting 113. An extension 313 extends from the diverter 311 toward the inner wall 301. The distance between the end of the extension 313 on the diverter 311 defines the cooling slot 300. The location and size of the slot 300 may be varied according to the cooling capacity required for the VCMs of specific disk drives and designs.

Figure 3:
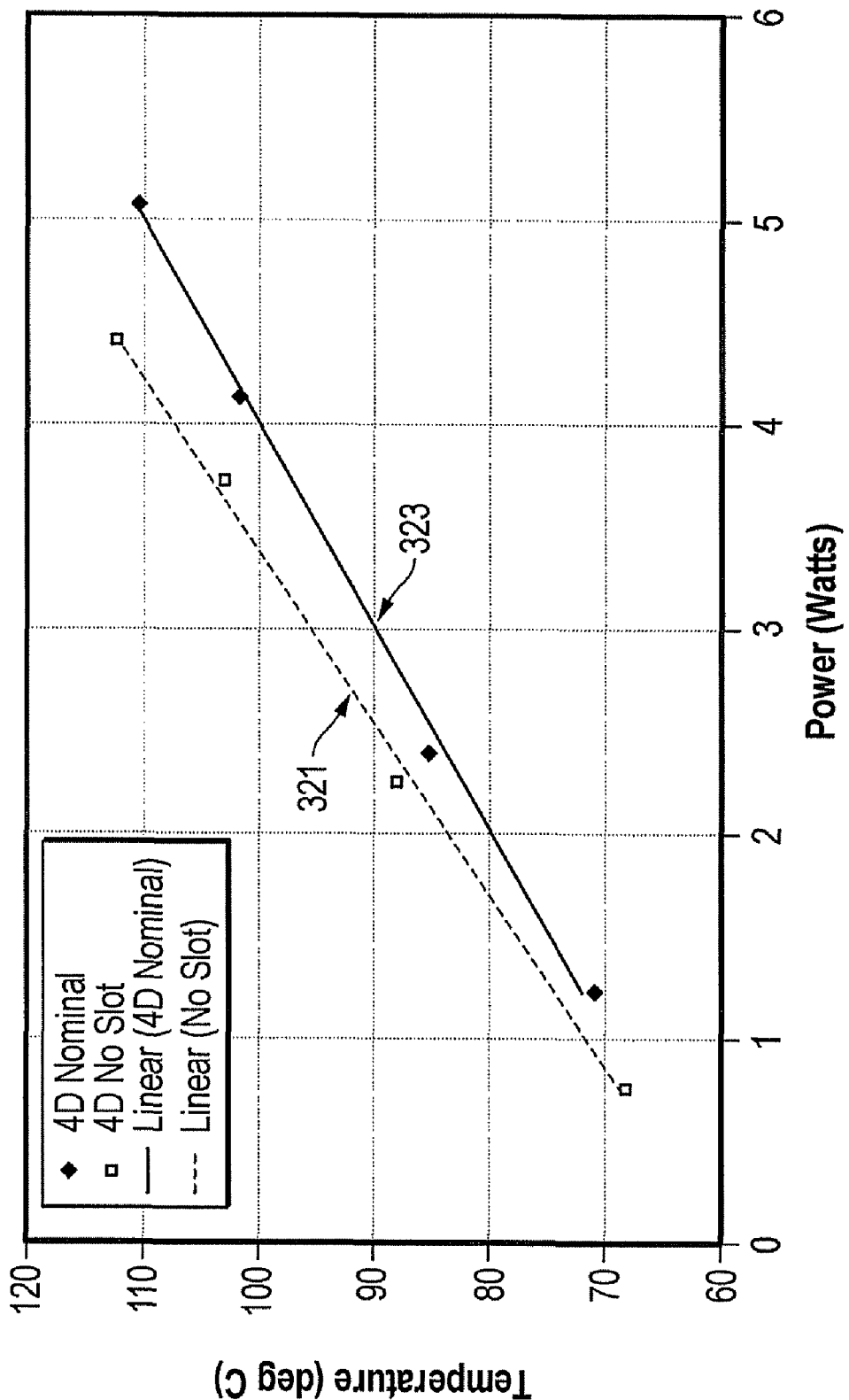
FIG. 3 is a plot of coil power and temperature for disk drives.

As shown in FIG. 3, the invention provides a significant increase in coil cooling capacity for slot geometries over previous designs with no slot provided. For example, plot 321 depicts the coil temperature in a conventional disk drive having no cooling slot, while plot 323 depicts a drive equipped with the cooling slot of the present invention.

Figure 4:
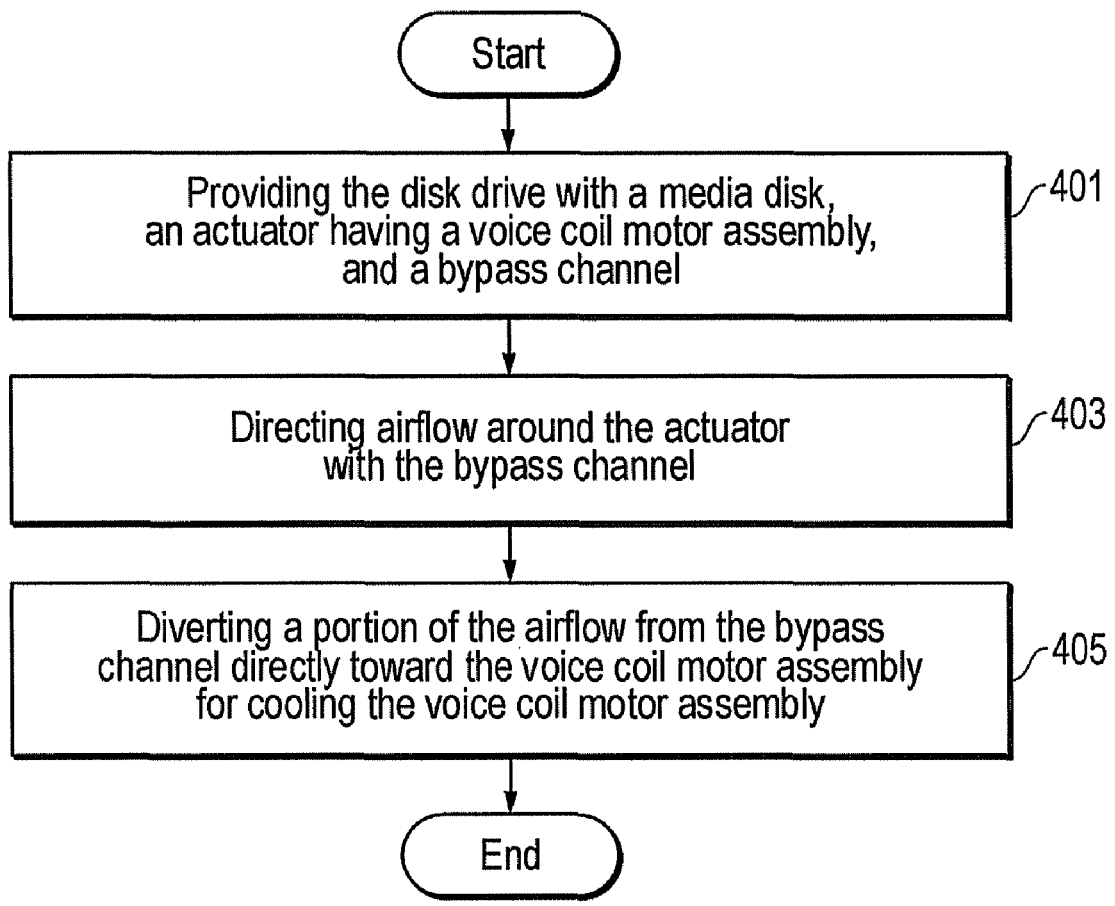
FIG. 4 is a high level flow diagram of a method in accordance with the present invention.

Referring now to FIG. 4, the invention also comprises a method of directing airflow in a disk drive. In one embodiment the method comprises providing the disk drive with a media disk, an actuator having a voice coil motor assembly, and a bypass channel (step 401); directing airflow around the actuator with the bypass channel (step 403); diverting a portion of the airflow from the bypass channel directly toward the voice coil motor assembly for cooling the voice coil motor assembly (step 405); before ending as indicated. The method may further comprise other embodiments as shown and described herein.

While the invention has been shown or described in only some of its forms, it should be apparent to those skilled in the art that it is not so limited, but is susceptible to various changes without departing from the scope of the invention.

What is claimed is:

1. A disk drive, comprising:
a housing having a hub that defines an axis of rotation;
a media disk mounted to the hub for rotation relative to the housing, the media disk having a downstream side and an upstream side;
an actuator mounted to the housing and movable relative to the media disk, the actuator having a head for reading data from the media disk, and a voice coil motor assembly;
a bypass channel located in the housing for directing airflow from the downstream side of the media disk to the upstream side of the media disk; and
an opening formed in the bypass channel for directing a portion of the airflow toward the voice coil motor assembly, the opening is flush with an inner wall of the bypass channel, and the opening spans a linear gap of approximately 1 mm to 20 mm.

2. A disk drive according to claim 1, wherein the opening is formed in the bypass channel directly adjacent to the voice coil motor assembly.

3. A disk drive according to claim 1, wherein the disk drive has a diverter, and the opening is a slot located between the diverter and an inner wall of the bypass channel.

4. A disk drive according to claim 3, wherein the slot is defined between an extension of the diverter and the inner wall.

5. A disk drive according to claim 1, wherein the bypass channel has an inner wall, and the opening comprises a same axial dimension as the inner wall.

6. A disk drive according to claim 1, wherein the opening extends in a radial direction relative to the media disk, and comprises a rectangular hole.

7. A disk drive according to claim 1, wherein the opening is located on a downstream side of the media disk.

8. A disk drive, comprising:
- a housing having a hub that defines an axis of rotation;
- a media disk mounted to the hub for rotation relative to the housing, the media disk having a downstream side and an upstream side;
- an actuator mounted to the housing and movable relative to the media disk, the actuator having a head for reading data from the media disk, and a voice coil motor assembly;
- a bypass channel located in the housing for directing airflow from the downstream side of the media disk to the upstream side of the media disk, the bypass channel having an inner wall; and
- an opening formed in the bypass channel on the downstream side of the media disk directly adjacent to the voice coil motor assembly for directing a portion of the airflow toward the voice coil motor assembly, the opening is flush with an inner wall of the bypass channel, and the opening spans a linear gap of approximately 1 mm to 20 mm.

9. A disk drive according to claim 8, wherein the disk drive has a diverter, and the opening is a slot located between the diverter and an inner wall of the bypass channel.

10. A disk drive according to claim 9, wherein the slot is defined between an extension of the diverter and the inner wall.

11. A disk drive according to claim 8, wherein the opening comprises a same axial dimension as the inner wall.

12. A disk drive according to claim 8, wherein the opening extends in a radial direction relative to the media disk, and comprises a rectangular hole.

13. A method of directing airflow in a disk drive, comprising:
- (a) providing the disk drive with a media disk, an actuator having a voice coil motor assembly, and a bypass channel;
- (b) directing airflow around the actuator with the bypass channel; and
- (c) diverting a portion of the airflow from the bypass channel through an opening directly toward the voice coil motor assembly for cooling the voice coil motor assembly, the opening is flush with an inner wall of the bypass channel, and the opening spans a linear gap of approximately 1 mm to 20 mm.

14. A method according to claim 13, wherein step (c) occurs on a downstream side of the media disk.

15. A method according to claim 13, wherein step (c) comprises forming an opening in the bypass channel directly adjacent to the voice coil motor assembly.

16. A method according to claim 15, wherein the disk drive has a diverter, and the opening is a slot located between the diverter and an inner wall of the bypass channel.

17. A method according to claim 16, wherein the slot is defined between an extension of the diverter and the inner wall.

* * * * *

UNITED STATES PATENT AND TRADEMARK OFFICE
CERTIFICATE OF CORRECTION

| | | |
|---|---|---|
| PATENT NO. | : 7,936,533 B2 | Page 1 of 1 |
| APPLICATION NO. | : 11/876014 | |
| DATED | : May 3, 2011 | |
| INVENTOR(S) | : Andre S. Chan, Chisin Chiang and Ferdinand Hendriks | |

It is certified that error appears in the above-identified patent and that said Letters Patent is hereby corrected as shown below:

Title page, item [75] the second inventor, "Chisin Chang", should be changed to --Chisin Chiang--

Signed and Sealed this
Thirty-first Day of July, 2012

David J. Kappos
*Director of the United States Patent and Trademark Office*